US009780864B2

(12) United States Patent
Nagakubo et al.

(10) Patent No.: US 9,780,864 B2
(45) Date of Patent: Oct. 3, 2017

(54) SELECTION OF A PARENT NODE BY A WIRELESS COMMUNICATION DEVICE IN A WIRELESS RELAY COMMUNICATION NETWORK

(71) Applicant: KABUSHIKI KAISHA TOSHIBA, Tokyo (JP)

(72) Inventors: Sakie Nagakubo, Kawasaki Kanagawa (JP); Ren Sakata, Yokohama Kanagawa (JP); Hiroki Kudo, Kawasaki Kanagawa (JP); Yuji Tohzaka, Kawasaki Kanagawa (JP); Fumiaki Kanayama, Kawasaki Kanagawa (JP); Suh Wuk Kim, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/384,242

(22) Filed: Dec. 19, 2016

(65) Prior Publication Data

US 2017/0244471 A1    Aug. 24, 2017

(30) Foreign Application Priority Data

Feb. 23, 2016    (JP) .................................. 2016-032273

(51) Int. Cl.
*H04W 72/04*    (2009.01)
*H04B 7/155*    (2006.01)
(Continued)

(52) U.S. Cl.
CPC .......... *H04B 7/155* (2013.01); *H04W 40/005* (2013.01); *H04W 72/0426* (2013.01); *H04W 84/18* (2013.01)

(58) Field of Classification Search
None
See application file for complete search history.

(56) References Cited

U.S. PATENT DOCUMENTS

| 2014/0226667 A1* | 8/2014 | Veillette | ................. H04L 45/34 |
| | | | 370/392 |
| 2015/0327261 A1* | 11/2015 | Thubert | ................ H04W 40/22 |
| | | | 370/336 |

(Continued)

FOREIGN PATENT DOCUMENTS

| JP | 2009135708 A | 6/2009 |
| JP | 4517885 B2 | 8/2010 |
| JP | 2016054349 A | 4/2016 |

*Primary Examiner* — Diane Mizrahi
(74) *Attorney, Agent, or Firm* — Oblon, McClelland, Maier & Neustadt, L.L.P.

(57) ABSTRACT

A wireless communication device for wireless relay communication includes a network interface, a data storage, and a processor. The processor determines whether or not to continue communication with a current parent node based on a communication status with the current parent node. Upon determining not to continue communication with the current parent node, the processor determines part of the nodes in the network to be one or more candidates for a new parent node, based on hop numbers of the nodes stored in the data storage, each of which is associated with one of the nodes in the network, wherein a hop number of a node indicates a node distance between the node and a reference node, causes the network interface to be in a receivable state during time slots associated with the one or more candidates, and selects one of the candidates as the new parent node.

20 Claims, 10 Drawing Sheets

(51) Int. Cl.
*H04W 40/00* (2009.01)
*H04W 84/18* (2009.01)

(56) References Cited

U.S. PATENT DOCUMENTS

2016/0066319 A1     3/2016   Sakata et al.
2017/0070941 A1*    3/2017   Veillette .................. H04L 45/34

* cited by examiner

SELECTION OF A PARENT NODE BY A WIRELESS COMMUNICATION DEVICE IN A WIRELESS RELAY COMMUNICATION NETWORK

CROSS-REFERENCE TO RELATED APPLICATION

This application is based upon and claims the benefit of priority from Japanese Patent Application No. 2016-032273, filed Feb. 23, 2016, the entire contents of which are incorporated herein by reference.

FIELD

Embodiments described herein relate generally to a wireless communication device for communication in a wireless relay communication network, in particular, selection of a parent node by the wireless communication device.

BACKGROUND

Generally, a wireless mesh network is established with a plurality of wireless communication devices that are wirelessly connected to each other. If a wireless communication device on the network receives data from another wireless communication device, the wireless communication device combines the received data with data generated by the wireless communication device itself, and transmits the combined data to a parent node. By repeating this data transmission through a plurality of nodes, data is relayed to a destination. However, in wireless communication, data may not reach the parent node due to interference of carrier waves and the like. When the wireless communication device determines that it is not possible to continue communication with the parent node, the wireless communication device searches for a new parent node.

However, the time to determine a new parent node increases as the number of candidate wireless communication device for the new parent node increases.

DETAILED DESCRIPTION

An embodiment is directed to techniques for more reliably switching to a new parent node.

According to an embodiment, a wireless communication device for wireless relay communication in a network of a plurality of nodes, each of which is a wireless communication device, includes a network interface, a data storage, and a processor. The processor is configured to determine whether or not to continue communication with a current parent node based on a communication status with the current parent node. Upon determining not to continue communication with the current parent node, the processor determines part of the nodes in the network to be one or more candidates for a new parent node, based on hop numbers of the nodes stored in the data storage, each of which is associated with one of the nodes in the network, wherein a hop number of a node indicates a node distance between the node and a reference node, cause the network interface to be in a receivable state during time slots associated with the one or more candidates, and select one of the candidates as the new parent node, based on a communication status with each of the one or more candidates.

Hereinafter, embodiments will be described with reference to the drawings.

First Embodiment

Figure 1:
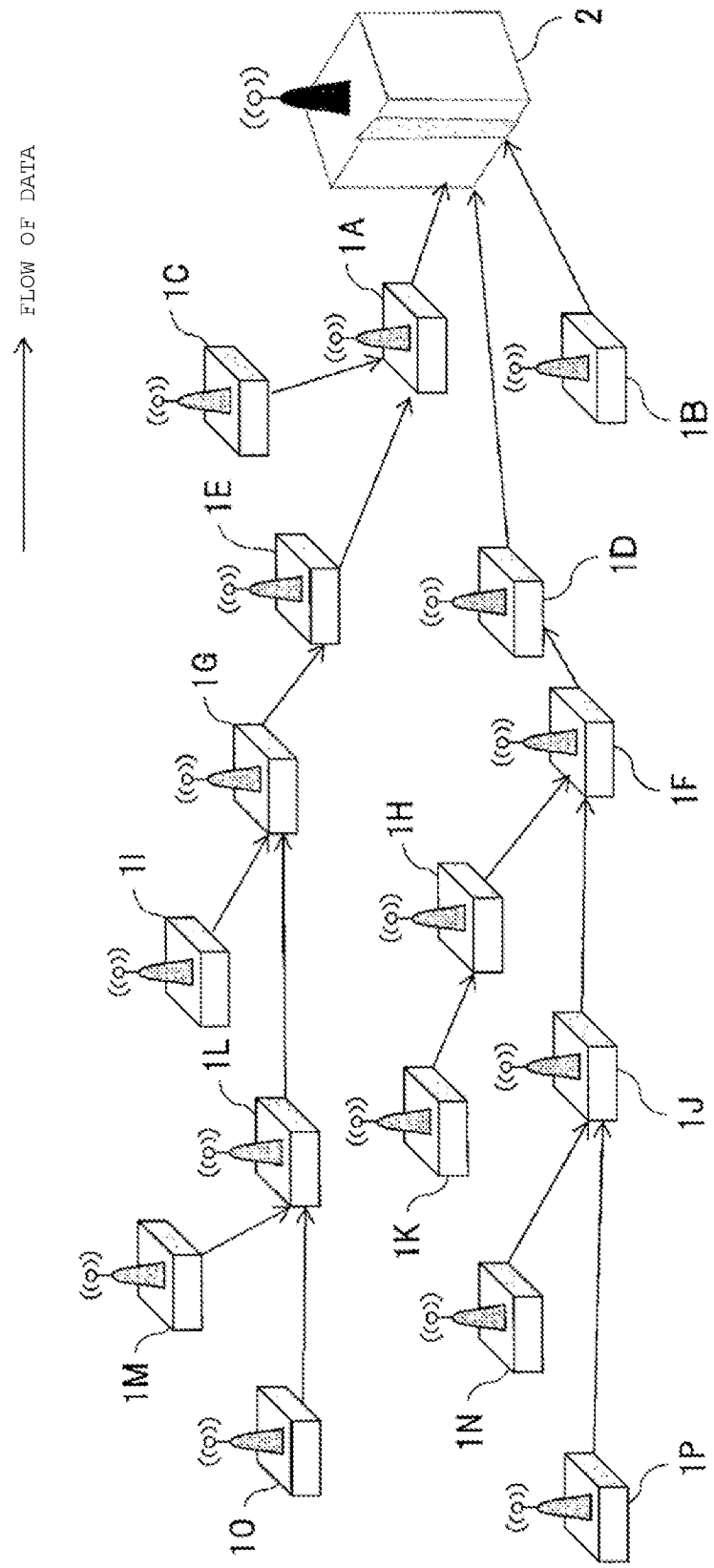
FIG. 1 illustrates a wireless mesh network.

FIG. 1 illustrates a wireless mesh network. The wireless mesh network is assumed to include a plurality of wireless communication devices 1 (1A to 1P) and one aggregation device 2. In FIG. 1, the wireless communication devices 1 are distinguished from each other by alphabets (A to P) as a suffix. The number of the wireless communication devices 1 is not limited to any one particular number. A wireless communication device which is different from the wireless communication devices 1 and the aggregation device 2 also may be included in the wireless mesh network. Alternatively, only the plurality of wireless communication devices 1, i.e., no aggregation device 2, may be included in the wireless mesh network. In this case, one of the plurality of wireless communication devices 1 may function as the aggregation device. Further, a plurality of aggregation devices 2 may be provided, and the wireless mesh network may include a plurality of sub-networks each of which includes one aggregation device 2.

The wireless communication device 1 performs wireless communication with other wireless communication devices 1 and the aggregation device 2. For example, the wireless communication device 1 corresponds to an access point.

The aggregation device 2 is, for example, a communication device connected to another network. For example, the aggregation device 2 corresponds to a gateway. Data transmitted by a plurality of wireless communication devices 1 in the wireless mesh network are aggregated in the aggregation device 2. The aggregation device 2 may have the same configuration as the wireless communication device 1.

Each of arrows in FIG. 1 indicates a transmission route of information (data). The base of the arrow indicates a transmission source of data, and the tip of the arrow indicates a transmission destination of the data. Here, as illustrated by the arrows in FIG. 1, multi-hop communication of data relay to the aggregation device 2 by the plurality of wireless communication devices 1 is assumed.

It is assumed that each of the wireless communication devices 1 stores information of the number of hops between the aggregation device 2 and the wireless communication device 1 itself. Also, it is assumed that each of the wireless communication devices 1 stores information of the number of hops between the aggregation device 2 and another wireless communication device 1. In the following description, the term "number of hops" is used to mean the number of hops to the aggregation device 2 unless indicated otherwise. In the network comprising the wireless communication devices 1, the number of hops means the number of hops between a wireless communication device 1 that initiates data transmission and the aggregation device 2. For example, data transmitted by each of the wireless communication devices 1 includes the number of hops of the wireless communication device itself, and thus each of the wireless communication devices 1 can obtain the number of hops of other wireless communication devices 1. The aggregation device 2 may transmit information of the number of hops to each of the wireless communication devices 1 regularly or when the configuration of the network is changed.

Each of the wireless communication devices 1 transmits data received from another wireless communication device 1 of which number of hops is greater than that of the wireless communication device 1 itself by one, to the other wireless communication device 1 of which number of hops is smaller than that of the wireless communication device 1 itself by one.

Here, when the wireless communication device 1 transmits data to another wireless communication device 1, the wireless communication device 1 that is a transmission destination, is referred to as a parent node of the wireless communication device 1 that is a transmission source. For example, in the network shown in FIG. 1, a parent node of the wireless communication device 1G is the wireless communication device 1E. Also, the wireless communication device 1 that is the transmission source is referred to as a child node of the wireless communication device 1 that is the transmission destination. In the network in FIG. 1, child nodes of the wireless communication device 1G are the wireless communication devices 1I and 1L. Further, the aggregation device 2 is referred to as a root node, and one of the wireless communication devices 1 being referenced in particular may be referred to as an own node.

Moreover, a node of which number of hops is smaller is referred to as a higher node, and a node of which number of hops is larger is referred to as a lower node. That is, data flows in a direction from the lower node to the higher node, in such a manner that the data passes from the child node to the own node, and from the own node to the parent node.

The wireless communication device 1 may transmit data generated by the own node to the parent node, in addition to data received from the child node. At this time, the data generated by the own node is combined with data received from the child node, and the combination of data is transmitted to the parent node.

Data transmitted from the wireless communication device 1 may not reach the parent node due to interference of carrier waves and the like. According to the present embodiment, each of the wireless communication devices 1 determines whether or not to continue wireless communication with the parent node, based on information (communication status information) regarding a communication status with the parent node. An example of the information regarding the communication status with the parent node includes: (1) whether or not wireless communication between the own node (transmission and reception processing unit of the own node) and the parent node was disconnected in a predetermined period in the past, (2) the number of times the wireless communication between the own node and the parent node was disconnected, (3) the number of times the wireless communication between the own node and the parent node was disconnected consecutively, (4) the total number of child nodes from which the parent node receives data, (5) the number of pieces of data the parent node receives from the child node(s), (6) the number of hops of the parent node, (7) the strength of a signal (signal indicating communication quality with the parent node) that the own node receives from the parent node, and (8) an error rate of data that the own node receives from the parent node. When it is determined that the wireless communication with the parent node cannot be continued, the wireless communication device 1 switches to a new parent node.

Timing at which the wireless communication devices 1 perform wireless communication will be described below in detail.

Each of the wireless communication devices 1 transmits data in accordance with a time division communication scheme. In the time division communication scheme, a predetermined constant period is referred to as a frame (referred to herein as a "transmission period"). The frame is divided into a plurality of sections, and each of the divided sections is referred to as a slot (referred to herein as a "unit period"). As used herein, the term "frame" does not mean a unit of data involved in data communication.

One slot is assigned to each of the wireless communication devices 1 for data transmission. One slot may be assigned to only one wireless communication device 1. A wireless communication device 1 can transmit data during the assigned slot. Transmission of data is not possible during a slot which is not assigned to the wireless communication device 1. Thus, each of the wireless communication devices 1 can transmit data during one slot of each frame.

Each of the wireless communication devices 1 is assumed to store a correspondence between the wireless communication devices 1 in the network and the slots in each frame. The wireless communication device 1 determines an operation of the wireless communication device 1 itself, based on the correspondence.

For example, since data may be sent from the child node during the slot assigned to the child node, the wireless communication device 1 goes into a reception waiting state during that slot. The reception waiting state means a state where power is supplied to the wireless communication device 1 and the wireless communication device 1 can perform reception processing when data is sent. Specifically, the reception waiting state is, for example, a state where power is supplied to a transmission and reception processing section 101 (See FIG. 2) thereof. In addition, during a slot assigned to the parent node, the wireless communication device 1 goes into the reception waiting state to confirm a communication status with the parent node. Further, each node may be in the reception waiting state for slots during which a request to serve as a new parent node can be transmitted from near nodes.

For example, the wireless communication device 1G in FIG. 1 performs data transmission during a slot assigned to the wireless communication device 1G. The wireless communication device 1G is in the reception waiting state during a slot assigned to the wireless communication device 1I, a slot assigned to the wireless communication device 1L, and a slot assigned to the wireless communication device 1E.

For example, during a slot which is not assigned to any of the own node, a parent node, and a child node, the wireless communication device 1 does not perform data transmission and data reception. Thus, during the slot which is not assigned to any of the own node, a parent node, and a child node, the wireless communication device 1 can be in a sleep state. In the sleep state of the wireless communication device 1, for example, the transmission and reception processing section 101 (See FIG. 2) thereof is in the sleep state. When the transmission and reception processing section 101 is in the sleep state, data transmission and data reception are not performed. For example, when the transmission and reception processing section 101 is in the sleep state, power supply to the transmission and reception processing section 101 is stopped, or data received by the transmission and reception processing section 101 is discarded. In the sleep state, power consumption of the wireless communication device 1 is reduced with respect to the reception waiting state.

Figure 2:
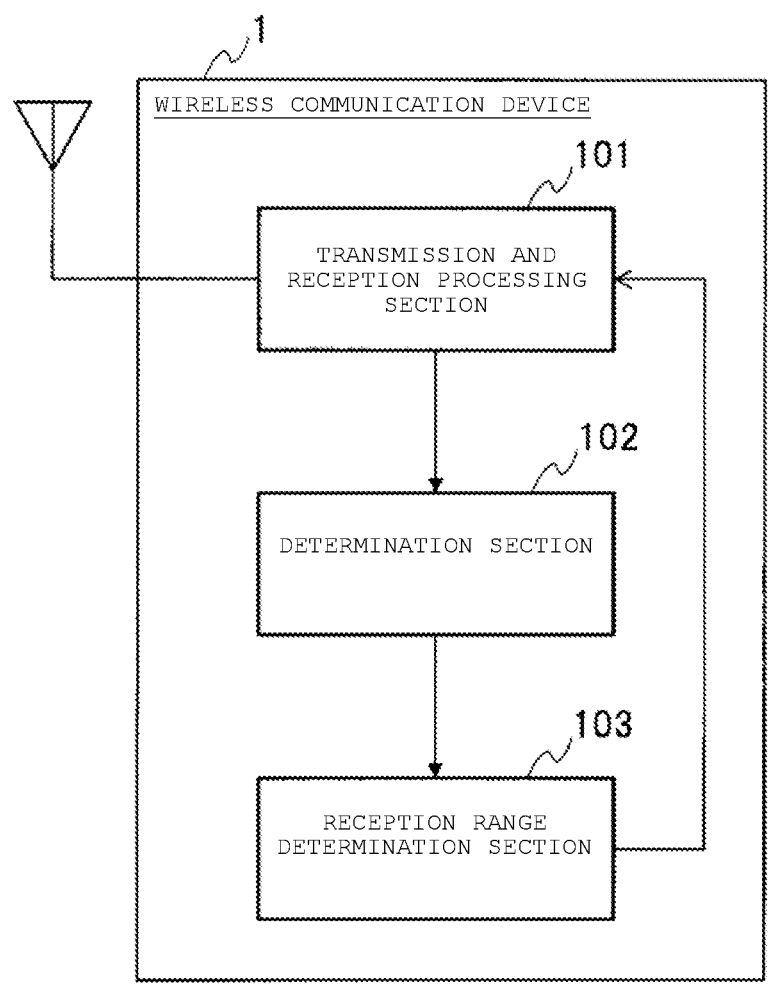
FIG. 2 is a block diagram of a wireless communication device according to a first embodiment.

Next, a configuration of the wireless communication device 1 will be described. FIG. 2 is a block diagram of the wireless communication device 1 according to the first embodiment. The wireless communication device 1 according to the first embodiment includes the transmission and reception processing section 101 and a determination section 102. The wireless communication device 1 may further include a reception range determination section 103.

The wireless communication device 1 may include functional sections other than the above-described sections.

The transmission and reception processing section 101 transmits and receives data with other wireless communication devices 1 and the aggregation device 2 connected thereto by wireless communication. For example, the transmission and reception processing section 101 receives data during a slot assigned to a child node, and transmits the data received from the child node to a parent node during a slot assigned to its own node. The transmission and reception processing section 101 also receives data during a slot assigned to the parent node.

The determination section 102 determines whether or not to continue communication with the parent node, based on communication status information for communicating with the parent node received during the slot assigned to the parent node. The criteria for determining whether or not to continue the communication may be defined arbitrarily. For example, it may be determined to not continue (1) when data could not be received from the parent node during a predetermined period, (2) when the number of times data could not be received is more than a predetermined value, (3) when the number of times data could not be received continuously is more than a predetermined value, (4) when an error rate of data reception is higher than a predetermined value, (5) when the strength of a received electric wave signal is smaller than a predetermined value, (6) when the number of hops of the parent node is more or less than a predetermined value, (7) when the total number of child nodes from which the own node receives data is more than a predetermined value, or (8) when the total number of pieces of data that the parent node receives is more than a predetermined value.

When the determination section 102 determines to not continue the data transmission to the parent node, the transmission and reception processing section 101 receives data from a predetermined wireless communication device. In other words, the transmission and reception processing section 101 receive no data from wireless communication devices other than the predetermined wireless communication device. In addition, the determination section 102 allows the transmission and reception processing section 101 to transmit data to be delivered to the predetermined wireless communication device, instead of the wireless communication device that was the parent node. That is, the determination section 102 searches for a new parent node. Specifically, when the determination section 102 determines to not continue communication with the current parent node, the reception range determination section 103 determines a reception range during which a process for searching for a new parent node is performed.

In one embodiment, the reception range is a time period during which the wireless communication device 1 is in the reception waiting state (receivable state). Alternatively, the reception range may be a frequency range of receivable radio wave signals. In the present embodiment, as described above, the wireless communication device 1 is in the sleep state, during slots which are not assigned to any of the own node, the parent node, and the child node. When a new parent node is searched for, the wireless communication device 1 goes into the reception waiting state, during the determined reception range. Since the reception range is limited, and the wireless communication device 1 is in the reception waiting state during a limited period of time. As a result, it is possible to reduce power consumption of the wireless communication device 1.

The reception range determination section 103 determines the reception range, for example, based on a predetermined reference number of hops. For example, the reception range determination section 103 sets each of slots assigned to a wireless communication device 1 (i.e., candidate for a new parent node) of which number of hops is smaller or greater than the reference number of hops by j or less (j is an integer of 1 or more), as the reception range. The reference number of hops may correspond to the number of hops of a wireless communication device 1 with which communication is likely to be performed properly. The reception range is specified in this manner, so that it is possible to reduce power consumption and to increase the probability of finding a new parent node with which good communication status can be ensured. If a searching time is too short, a wireless communication device with which preferable communication quality is not ensured may be set as a new parent node. As a result, the own node is likely to determine again to not continue communication with the new parent node. Particularly, because power consumption during the search for the new parent node is large, if the search for the parent node is frequently performed, the duration of continuous operation of the wireless communication device may be reduced. According to the present embodiment, it is possible to prevent reduction of the operation time. For convenience, the number j is referred to as the differential number of hops.

In the present embodiment, the reception range is set to slots assigned to wireless communication devices of which number of hops is smaller or greater than the reference number of hops by j or less. However, the reception range may be set to slots assigned to wireless communication devices of which number of hops is smaller than the reference number of hops by m or less (m is an integer of 1 or more) and of which number of hops is greater than the reference number of hops by n or less (n is an integer of 1 or more). For example, if the reference number of hops is set to 3, m is set to 2, and n is set to 1, slots assigned to wireless communication devices of which number of hops is between 1 and 4 is set to the reception range. The numbers m and n may be the same as each other or different from each other. Furthermore, instead of determination of the reception range by the reception range determination section 103, information regarding the reception range may be received from another wireless communication device.

In the present embodiment, the reception range is determined based on the number of hops of a parent node with which communication is determined to be discontinued. That is, the number of hops of the parent node is set as the reference number of hops. In the following descriptions, a parent node with which communication is determined to be discontinued is referred to as an old parent node.

For example, when the number of hops of an old parent node is 3, and j is set to 1, slots corresponding to wireless communication devices 1 of which number of hops is 2, 3, and 4 are set to the reception range. The number of wireless communication devices 1 (i.e., candidate for a new parent node) corresponding to the determined reception range may be equal to or more than 1.

The number of hops does not necessarily mean an actual distance between the wireless communication devices 1. Nevertheless, as a difference in the number of hops is increased, the actual distance tends to become longer, and thus communication quality tends to decrease. Thus, for example, when communication quality with an old parent node is good and the communication disconnection is caused by a problem and the like of the old parent node, the number of hops of the old parent node can be set as the reference number of hops according to the present embodiment.

The differential number j of hops is determined, for example, considering at least one of (1) a structure of a wireless network, (2) the number of hops of the own node, (3) the number of hops of the parent node, (4) an average value of the number of hops of wireless nodes from which the own node can receive data, (5) a standard deviation and the average value of the number of hops of wireless nodes from which the own node can receive data, (6) a time elapsed since the wireless network was formed, (7) a time elapsed since the own node is added to the wireless network, (8) the strength of a signal received from the parent node, and (9) an error rate of data received from the parent node. The differential number j of hops may be set in the reception range determination section 103 in advance. In addition, the differential number j of hops may be updated by receiving a control signal from another wireless communication device 1 and the like.

After the reception range is determined, the transmission and reception processing section 101 receives data based on the determined reception range. Then, when a communication status relating to reception of data satisfies a predetermined condition, the parent node is changed, and data is transmitted to a new parent node. For example, when a communication status of communication between a wireless communication device 1 which corresponds to the determined reception range and the own node is better than a communication status of communication between the wireless communication device 1 with which communication is determined to be discontinued (i.e., old parent node) and the own node, the wireless communication device 1 corresponding to the determined reception range is set to a new parent node. The communication status corresponds to, for example, at least one of (1) whether or not the wireless communication device and the own node successfully performed wireless communication therebetween, (2) whether or not the wireless communication between the wireless communication device and the own node was disconnected, (3) the number of times the wireless communication between the wireless communication device and the own node was disconnected, (4) the number of child nodes connected to the wireless communication device 1, (5) the number of pieces of data that the wireless communication device 1 receives from a child node, (6) the number of hops of the wireless communication device 1, (7) the strength of a signal that the own node receives from the wireless communication device, and (8) an error rate of data that the own node receives from the wireless communication device. Specifically, the wireless communication device 1 is set to be a new parent node in the following cases: (1) a case where data could be received from the wireless communication device in the previous predetermined period; (2) a case where the number of times data could not be received from the wireless communication device is less than a predetermined value; (3) a case where the number of times data could not be consecutively received from the wireless communication device is less than a predetermined value; (4) a case where an error rate of data from the wireless communication device is lower than a predetermined value; (5) a case where the strength of an electric wave received from the wireless communication device is larger than a predetermined value; (6) a case where the number of hops of the wireless communication device is more or less than a predetermined value; (7) a case where the total number of child nodes from which the wireless communication device receives data is less than a predetermined value; and (8) a case where the total number of pieces of data that the wireless communication device receives is less than a predetermined value. When there is a plurality of wireless communication devices 1 corresponding to the determined reception range, a wireless communication device of which communication status with the own node is best is set to be a new parent node. Other known methods can be used for determining a new parent node.

Figure 3:
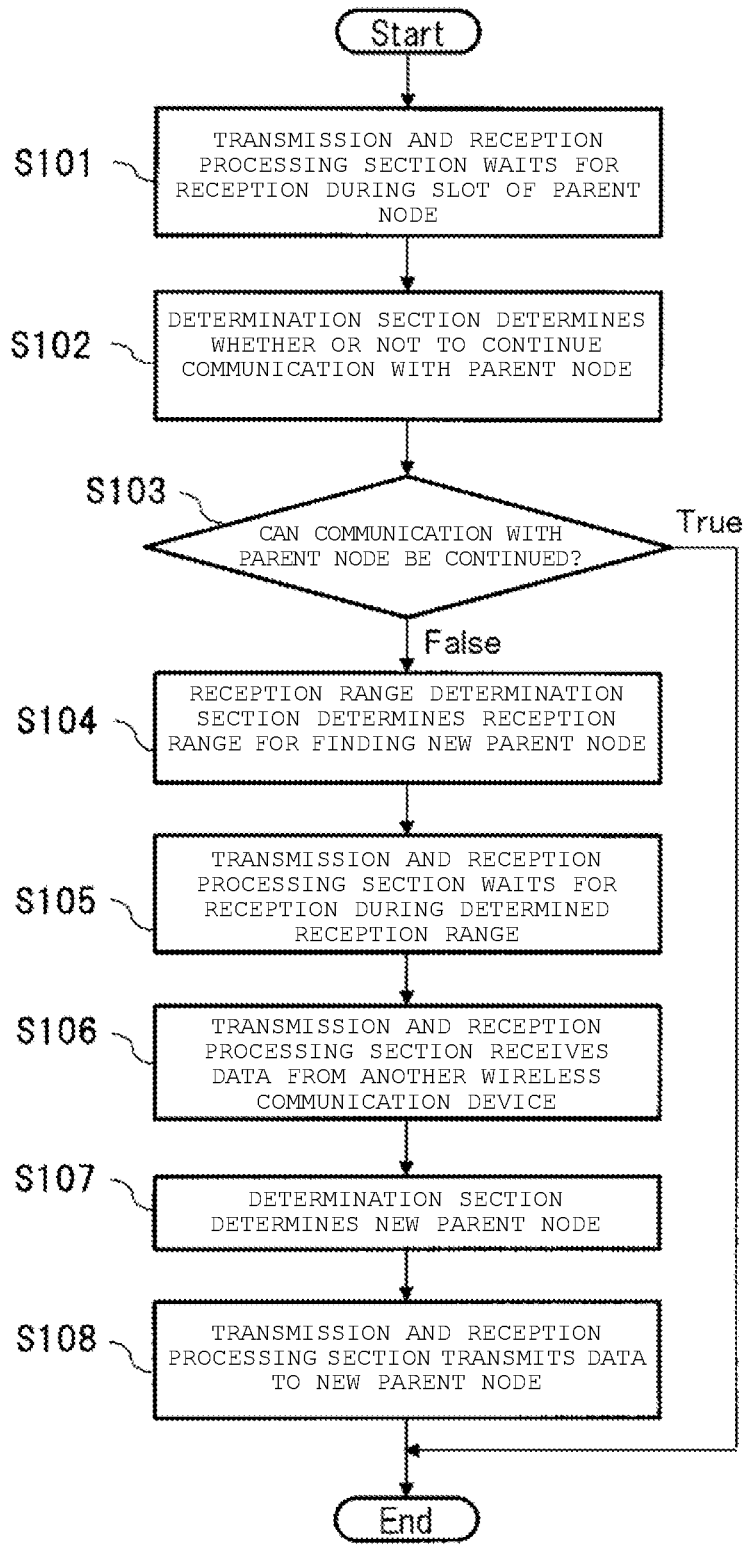
FIG. 3 is a flowchart illustrating processes of data collection processing for selecting a new parent node, which is carried out by the wireless communication device according to the first embodiment.

Next, a flow of processes of the wireless communication device 1 according to the first embodiment will be described. FIG. 3 is a flowchart of data collection processing for selecting a new parent node of the wireless communication device 1 according to the first embodiment. The processing is performed in order to acquire information from the parent node, during a slot assigned to the parent node, during which the wireless communication device 1 is in the reception waiting state.

The transmission and reception processing section 101 is in the reception waiting state during a transmission enabling period (slot) which is assigned to the parent node (S101). Communication status information including reception data, a reception result, and the like is sent to the determination section 102 while the wireless communication device 1 is in the reception waiting state. The determination section 102 determines whether or not to continue communication connection with the parent node, based on the communication status information (S102). The communication status information includes, for example, at least one of strength of a signal received from the parent node, an error rate of data received from the parent node, the number of hops of the parent node, whether wireless communication with the parent node was disconnected in a predetermined period in the past, the number of times the wireless communication was disconnected, the number of times the wireless communication was disconnected consecutively, the number of child nodes from which the parent node receives data, and the number of pieces of data received from the parent node. The above-described information is analyzed by the transmission and reception processing section 101, based on the communication status information received from the parent node. When the determination section 102 determines that it is possible to continue communication connection with the parent node (True in S103), the process is ended. When the determination section 102 determines it is not possible to continue the communication connection with the parent node (False in S103), the reception range determination section 103 determines the reception range for selecting candidates for a new parent node (S104). The determined reception range is delivered to the transmission and reception processing section 101, and the transmission and reception processing section 101 waits for reception of data during the reception range (S105). Then, the transmission and reception processing section 101 receives data from another wireless communication device during the reception range (S106). When it is determined that a communication status with the other wireless communication device satisfies a predetermined condition, the determination section 102 determines that wireless communication device to be a new parent node (S107). The transmission and reception processing section 101 transmits data to the new parent node (S108). Then, the process of the reception range determination processing ends.

As described above, the parent node is searched for within a specific reception range in which there is a high probability of communicating selectively with wireless communication devices 1 with which a good communication status is established. As it takes less time to find the new parent node, it is possible to find the new parent node with less power consumption. As a result, the number of days a battery mounted on the wireless communication device 1 endures can be extended. In addition, since a probability that the new parent node is a wireless communication device 1 of good communication quality is high, a probability of improving data collection rate in the root node may be increased.

Second Embodiment

Figure 4:
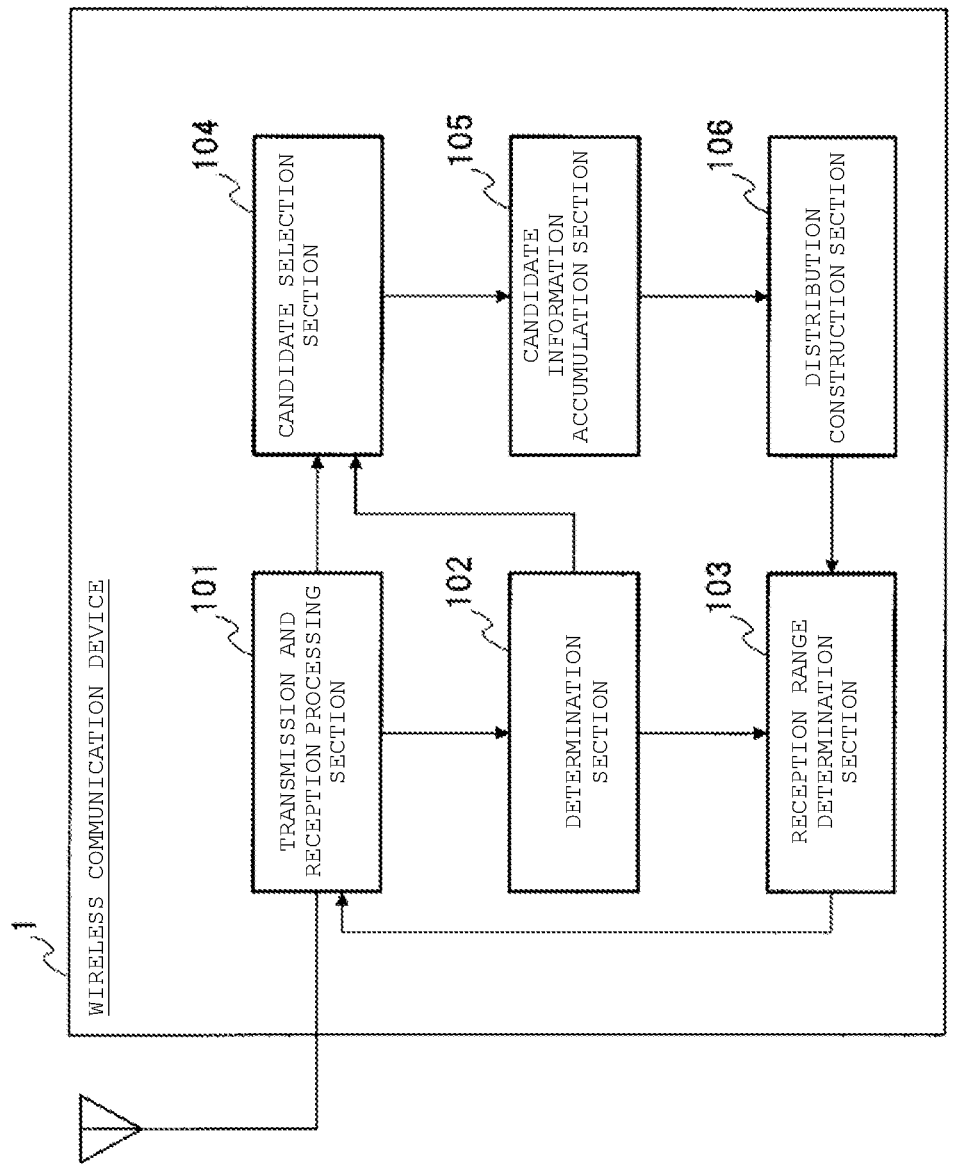
FIG. 4 is a block diagram of a wireless communication device according to a second embodiment.

FIG. 4 is a block diagram of a wireless communication device 1 according to a second embodiment. The wireless communication device 1 according to the second embodiment is different from that of the first embodiment in that the wireless communication device 1 further includes a candidate selection section 104 and a distribution generating section 106. The wireless communication device 1 can further include a candidate information accumulation section 105. In addition, a method in which the reception range determination section 103 determines the reception range in the second embodiment is different from that in the first embodiment. Descriptions for configuration similar to that in the first embodiment will be omitted.

In the second embodiment, the wireless communication device 1 calculates the reference number of hops and determines the reception range. Specific processing will be described below.

The candidate selection section 104 selects an appropriate parent node candidate (more specifically, preliminary candidate) from nodes in the network, based on an appropriate selection method which is predetermined.

As a method of selecting the parent node candidate, for example, the method described in the first embodiment and the like may be employed.

The parent node candidate means an optimal wireless communication device 1 based on data received by the transmission and reception processing section 101 during one transmission period (frame). The parent node candidate is repeatedly determined during a plurality of frames.

Here, the parent node candidate is selected from all or at least some of wireless communication devices 1 in the network.

The parent node candidate is selected once during one transmission period (frame). The candidate selection section 104 holds the number of times the selection was performed and a threshold value. The candidate selection section 104 selects the parent node candidate, for example, until the number of times becomes the threshold value. The threshold value may be set in the candidate selection section 104 in advance or input to the candidate selection section 104 from another wireless communication device through the transmission and reception processing section 101.

The candidate information accumulation section 105 stores the number of hops of each parent node candidate. The candidate information accumulation section 105 also stores the number of hops of the old parent node. The candidate information accumulation section 105 may also store additional information regarding the parent node candidate and the old parent node.

The distribution generating section 106 creates frequency distribution. The frequency distribution is distribution of a difference between the number of hops of each parent node candidate and the number of hops of the old parent node, which are accumulated in the candidate information accumulation section 105.

The reception range determination section 103 determines the reception range based on the frequency distribution calculated by the distribution generating section 106. In the second embodiment, the number of hops of which frequency is highest in the frequency distribution is set as a reference number. Slots corresponding to wireless communication devices 1 (i.e., candidate for a parent node) of which number of hops is smaller or greater than the reference number by j or less. Alternatively, each of slots corresponding to a wireless communication device 1 of which number of hops corresponds to a frequency equal to or more than a predetermined value is set as the reception range. The new parent node is selected, based on the reception range.

By determining the reception range based on the frequency distribution, it is possible to select the new parent node more efficiently.

Figure 5:
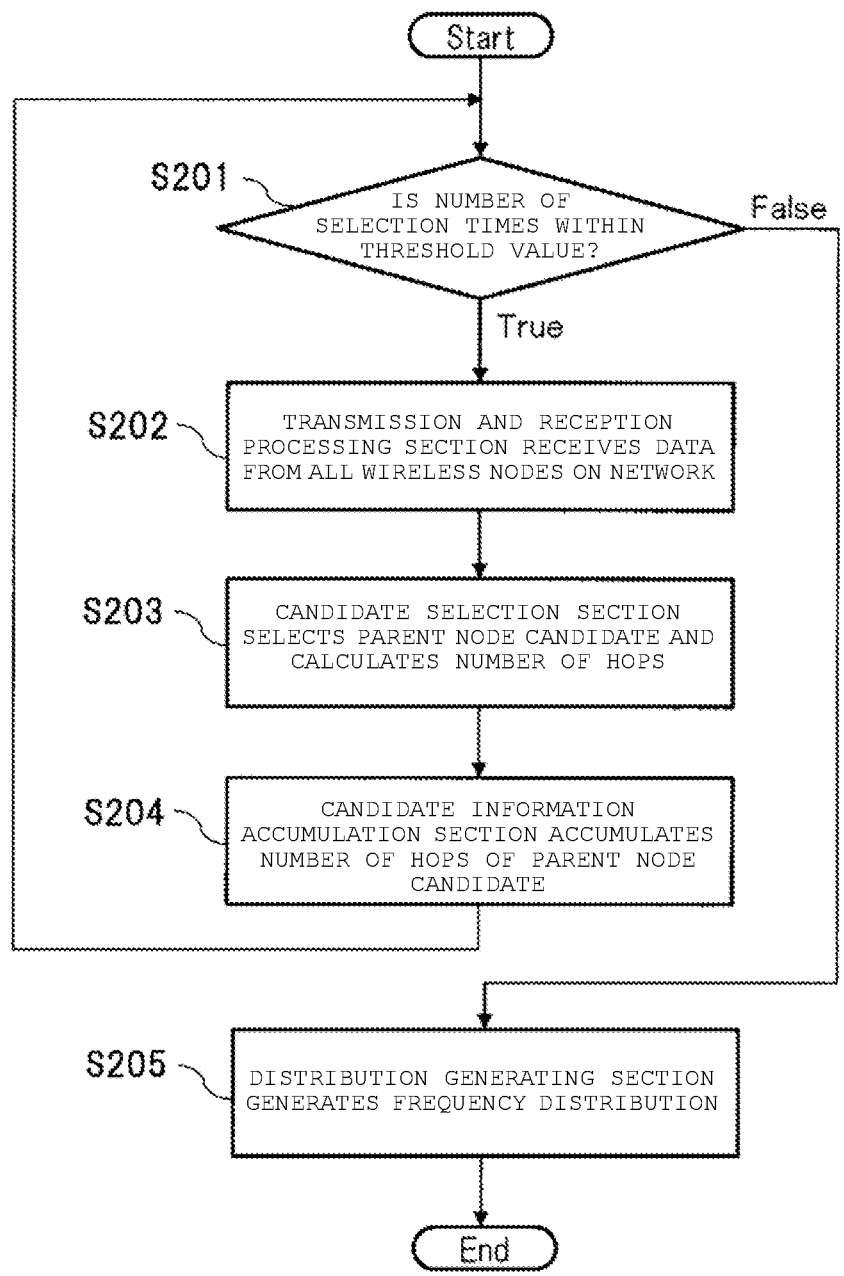
FIG. 5 is a flowchart illustrating processes of frequency distribution generation processing, which is carried out by the wireless communication device according to the second embodiment.

Next, a flow of processes of the wireless communication device 1 according to the second embodiment will be described. FIG. 5 is a flowchart illustrating frequency distribution generation processing. The frequency distribution generation processing is performed, for example, before a wireless communication is started, for example, when the wireless communication device 1 is powered on. For example, the frequency distribution generation processing may be performed in a period when a wireless communication with the current parent node is performed. The frequency distribution generation processing may be regularly performed, for example, when a predetermined period elapsed since the power on or at a predetermined time.

The candidate selection section 104 confirms whether the number of times the selection of the parent node candidate was performed is within the predetermined threshold value. When the number of times is within the threshold value (True in S201), the transmission and reception processing section 101 receives data from other wireless communication devices 1 in the network (S202). The received reception data is sent to the candidate selection section 104.

The candidate selection section 104 selects the parent node candidate (S203). A value indicating the number of selection times the selection of the parent node candidate was performed is increased by 1.

The number of hops of the selected parent node candidate is accumulated in the candidate information accumulation section 105 (S204). Then, it is determined again whether the number of selection times is within the predetermined threshold value (S201).

The processes from S202 to S204 are repeated until the determination result in S201 becomes False. If the number of selection times is more than the threshold value (False in S201), the distribution generating section 106 reads the numbers of hops of the parent node candidates and the number of hops of the old parent node, from the candidate information accumulation section 105. The distribution generating section 106 generates frequency distribution for a difference between the numbers of hops of each parent node candidate and the number of hopes of the old parent node (S205). Then, the process of the frequency distribution generation processing ends.

A flow of data collection processing of the wireless communication device 1 according to the second embodiment, which is carried out to select a new parent node, is different only in a point that the process (S104) in which the reception range determination section 103 determines the reception range for selecting the parent node is performed based on the frequency distribution generated by the distribution generating section 106 through the frequency distribution generation processing. For that reason, description for the flow of the data collection processing will be omitted.

As described above, according to the second embodiment, the optimal parent node candidate is selected in each of a plurality of transmission periods. Further, the reception range is determined based on the frequency distribution relating to the parent node candidates. As a result, it is possible to find a parent node with which a preferable communication status is established more efficiently compared to the first embodiment.

Third Embodiment

Figure 6:
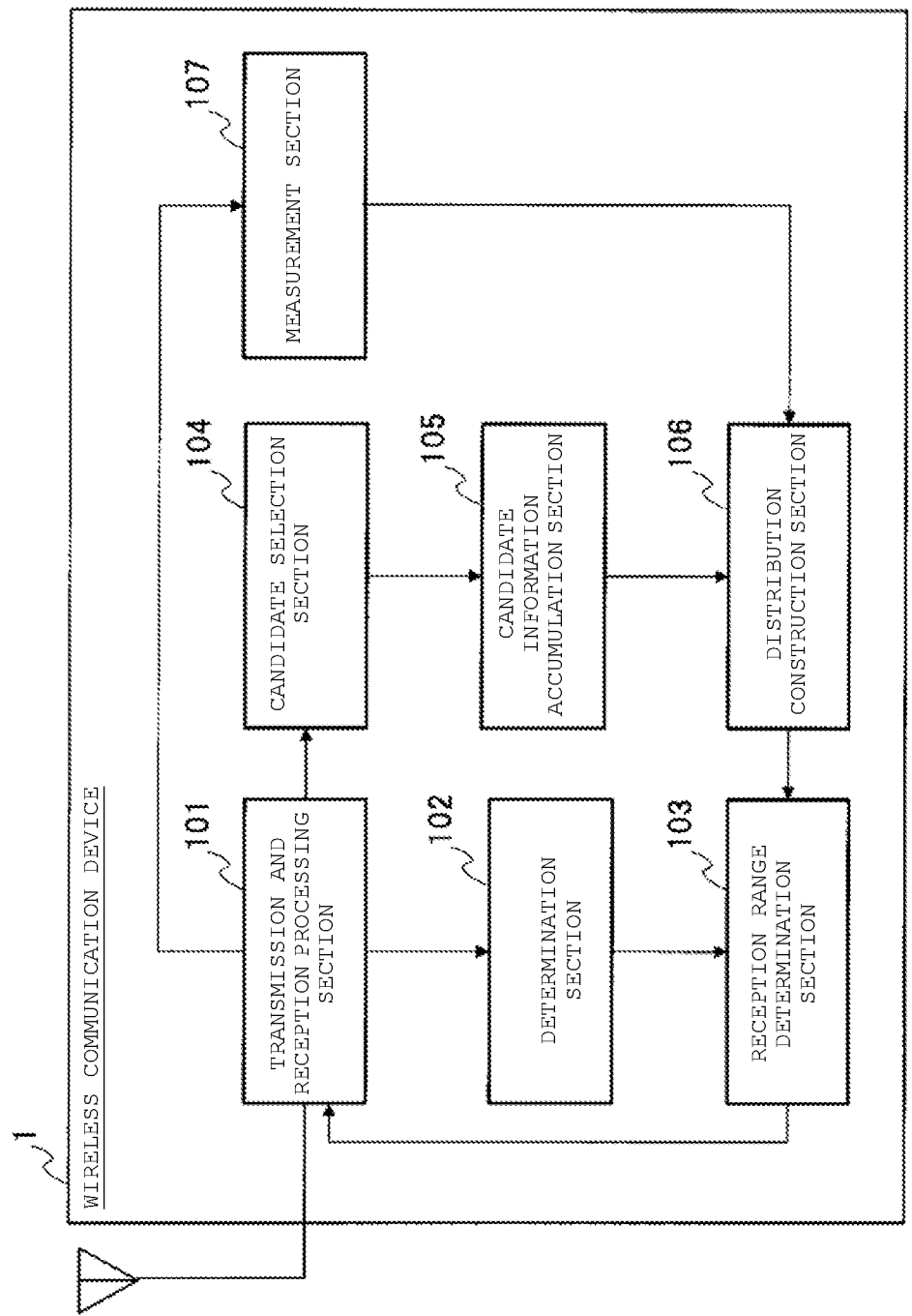
FIG. 6 is a block diagram of a wireless communication device according to a third embodiment.

FIG. 6 is a block diagram of a wireless communication device 1 according to a third embodiment. The wireless communication device 1 according to the third embodiment is different from that of the second embodiment in that the wireless communication device 1 further includes a measurement section 107. In addition, a point that the frequency distribution generated by the distribution generating section 106 is initialized is different from the second embodiment. Descriptions for configurations similar to those in the second embodiment will be omitted.

The measurement section 107 measures a parameter which relates to a state of a network to which the wireless communication device 1 belongs, data which is transmitted and received by the wireless communication device 1, or the like. An example of the parameter includes the number of times the transmission and reception processing section 101 transmitted data to another wireless communication device 1, the number of times data was received from another wireless communication device 1, the number of times selection of the parent node candidate was carried out, an average number of hops of all wireless communication devices 1 in the network, and a changed amount of the average number of hops.

The measurement may be started when the wireless communication device 1 is powered on, at a predetermined time, or a predetermined period after the previous measurement.

The measurement section 107 determines whether or not the frequency distribution generated by the distribution generating section 106 is initialized, based on the measured parameter. For example, the frequency distribution may be initialized when the calculated parameter value is more than a threshold value. A condition to perform initialization and the threshold value may be set in the measurement section 107 in advance or set in accordance with an instruction from the root node or another wireless communication device 1.

Figure 7:
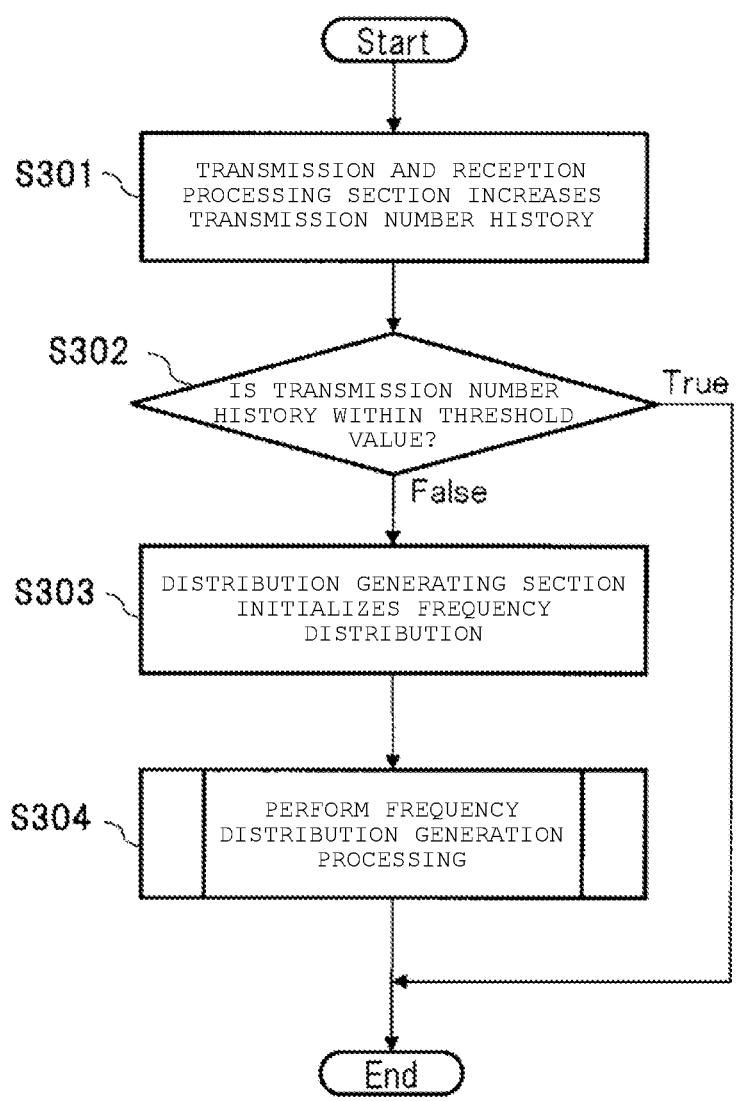
FIG. 7 is a flowchart illustrating processes of frequency distribution initialization processing, which is carried out by the wireless communication device according to the third embodiment.

Next, a flow of processes of the wireless communication device 1 according to the third embodiment will be described. FIG. 7 is a flowchart illustrating frequency distribution initialization processing. Here, it is assumed that the parameter to be measured is the number of times data transmission was performed by the transmission and reception processing section 101.

When the transmission and reception processing section 101 transmits data to the parent node, a transmission number history (number of transmission times) is increased by 1 (S301). The measurement section 107 acquires the transmission number history from the transmission and reception processing section 101, and compares the acquired transmission number history to a threshold value. When the number of transmission times is within the threshold value (True in S302), the process is ended. When the number of transmission times is more than the threshold value (False in S302), the measurement section 107 instructs the distribution generating section 106 to perform initialization, and the distribution generating section 106 initializes the frequency distribution (S303). Since the frequency distribution is initialized, the frequency distribution generation processing illustrated in FIG. 5 is performed in order to generate new frequency distribution (S304). Then, the frequency distribution initialization processing is ended.

Since the flow of the frequency distribution generation processing and the flow of the data collection processing for selecting a new parent node are similar to those in the second embodiment, description thereof will be omitted.

As described above, according to the third embodiment, the frequency distribution is initialized based on a network state measured by the measurement section 107, the number of times data transmission and data reception was performed, data transmitted or received, or the like. Because of the initialization, the frequency distribution that reflects the current network state can be obtained. As a result, it is possible to find a parent node with a preferable communication status more reliably compared to the second embodiment.

Fourth Embodiment

Figure 8:
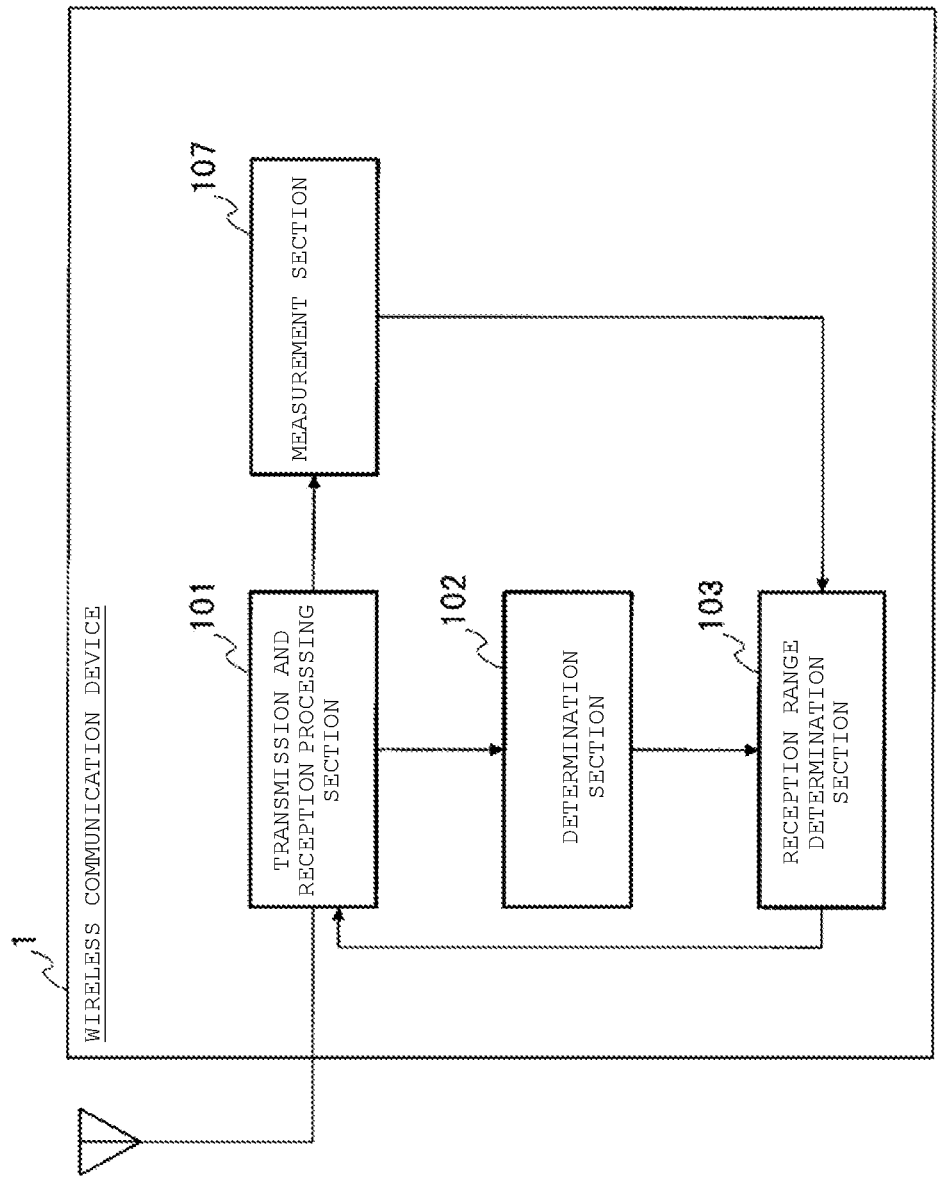
FIG. 8 is a block diagram of a wireless communication device according to a fourth embodiment.

FIG. 8 is a block diagram of a wireless communication device 1 according to a fourth embodiment. The wireless communication device 1 according to the fourth embodiment is different from that of the first embodiment in that the wireless communication device 1 further includes a measurement section 107. In addition, a point that the reception range determination section 103 changes the reception range based on a measurement result of the measurement section 107 is also different. Description for configurations similar to those in the first embodiment will be omitted.

The measurement section 107 according to the third embodiment measures a predetermined parameter value in order to initialize the frequency distribution. The measurement section 108 according to the fourth embodiment changes the reception range determined by the reception range determination section 103, based on the measured parameter value.

The measurement section 107 measures a parameter which relates to a state of a network to which the wireless communication device 1 belongs, data which is transmitted and received by the wireless communication device 1, or the like. For example, the measurement section 107 measures the number of times of connection to the parent node is terminated (number of communication disconnection times). The number of communication disconnection times may be the number of times the communication was disconnection continuously, or may be the total number within a predetermined period.

The reception range determination section 103 can change the reception range based on the parameter value. Specifically, the reception range determination section 103 changes the value of the differential number j of hops for determining the reception range. For example, assuming that the measurement section 107 measures the number of communication disconnection times as the parameter, when the measured number of communication disconnection times is 1 and the differential number j of hops is set to 0, an electric wave is received from a wireless communication device 1 having the number of hops same as the number of hops of the old parent node. When the measured number of communication disconnection number is 2 and the differential number j of hops is set to 1, an electric wave is received from wireless communication devices 1 having the number of hops which is smaller or greater than the number of hops of the old parent node by 1. When the number of communication disconnection times is 3 and the differential number j of hops is set to 2, an electric wave is received from wireless communication devices 1 having the number of hops which is smaller or greater the number of hops of the old parent node by 2.

As described above, for example, by setting the communication disconnection number N-1 to the differential number j of hops, it is possible to expand the reception range more as the number of communication disconnection times increases. When the number of communication disconnection times is equal to or more than 4, an electric wave is received from nodes included in a range of the total number of hops, that is, from all nodes in the network, without using the differential number j of hops. The threshold value for receiving an electric wave from all of the nodes may be arbitrarily determined.

The differential number j of hops may be changed in accordance with a parameter such as a network state, instead of the number of communication disconnection times. For example, the differential number j of hops may be increased as the strength of a radio wave received from the old parent node becomes lower than a threshold value.

Figure 9:
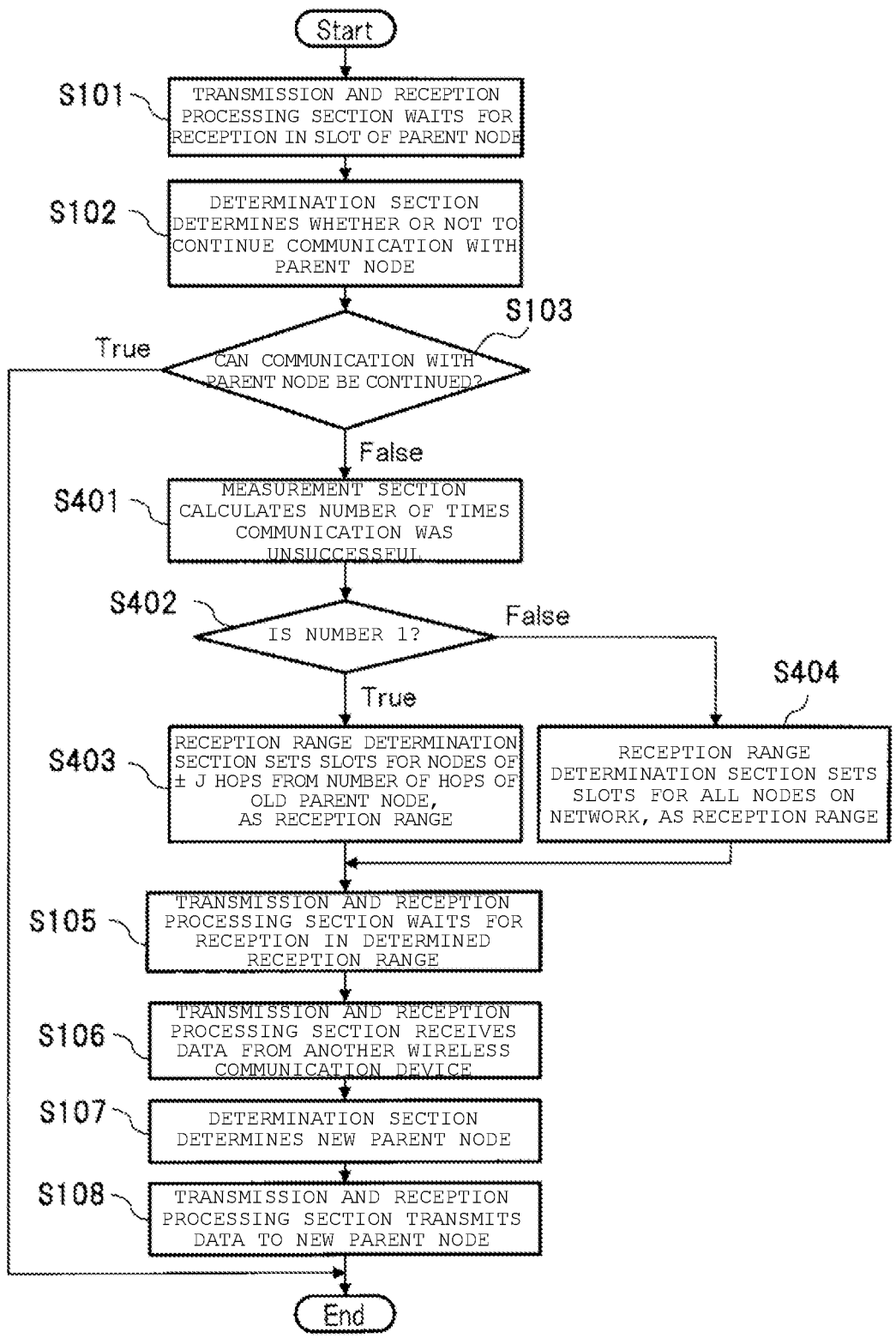
FIG. 9 is a flowchart illustrating processes of data collection processing for selecting a new parent node, which is carried out by the wireless communication device according to the fourth embodiment.

Next, a flow of processes of the wireless communication device 1 according to the fourth embodiment will be described. FIG. 9 is a schematic flowchart illustrating data collection processing for selecting a new parent node, according to the fourth embodiment.

The processes from S101 to S103 and an end of the process after determination of True in S103 are similar to the processes in the first embodiment illustrated in FIG. 4. Processes after determination that communication with the parent node is not possible (False in S103) are different from those in the first embodiment.

When the determination section 102 determines that it is not possible to continue communication with the parent node (False in S103), the measurement section 108 acquires the number of times the communication was continuously unsuccessful (S401). The measurement section 108 may count and hold the number of times. In this case, after True in S103, the measurement section 108 may initialize the number of times. The number is delivered to the reception range determination section 103.

The reception range determination section 103 determines the reception range based on the received number. Here, when the number is 1 (True in S402), the reception range determination section 103 sets slots associated with wireless communication devices having the number of hops that is greater or smaller than the number of hops of the old parent node by j or less, as the reception range (S403). When the number is not 1 (False in S402), the reception range determination section 103 sets slots corresponding to all nodes in the network as the reception range (S404).

The determined reception range is delivered to the transmission and reception processing section 101. The transmission and reception processing section 101 turns into the reception waiting state in the reception range (S105). The subsequent processes from S106 to S108 are also similar to those in the first embodiment. Then, the data collection processing for selecting a new parent node according to the fourth embodiment ends.

In the flow of FIG. 9, the threshold value for determination in S402 is set to 1, and the determination is branched into two of YES and NO. Alternatively, the determination may be branched into three or more. For example, the following method is applicable. Five times are set as a second threshold value, and the differential number j of hops is increased by 1 when the number of times is two to five. When the number of times of exceeds five, slots corresponding to all nodes are set as the reception range.

As described above, according to the fourth embodiment, it is possible to expand or reduce the predetermined reception range based on the network situation measured by the measurement section 108, the number of times of performing data transmission and reception, data transmitted or received, or the like. Thus, it is possible to more reliably find a parent node with a preferable communication status.

The processes in the above-described embodiments may be implemented by software (program). Thus, the wireless communication device 1 in the above-described embodiment can be achieved, for example, by using a general-purpose computer device as base hardware, in such a manner that a processor mounted in the computer device executes the program.

Figure 10:
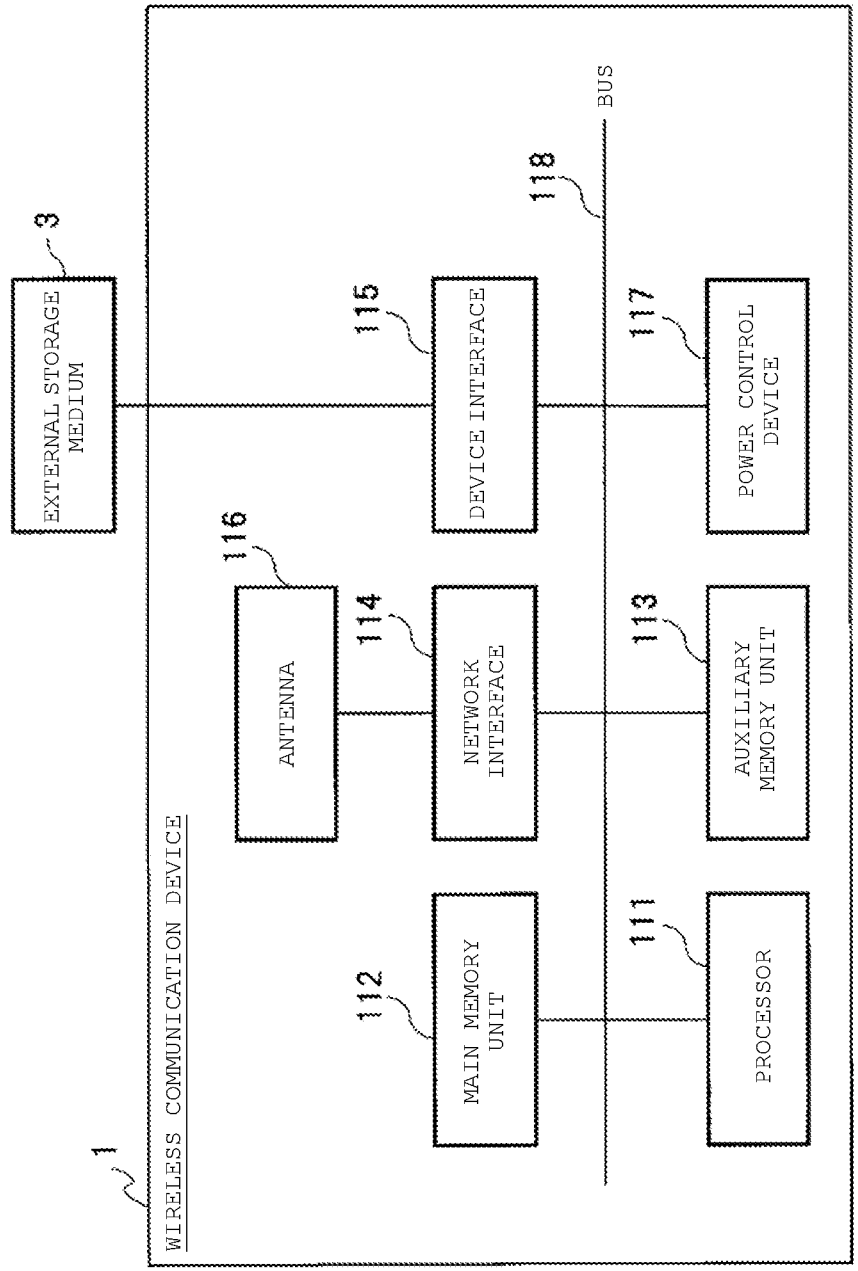
FIG. 10 is a block diagram illustrating a hardware configuration example of the wireless communication device according to an embodiment.

FIG. 10 is a block diagram illustrating a hardware configuration example of the wireless communication device 1 according to an embodiment. The wireless communication device 1 is a computer device that includes a processor 111, a main memory unit 112, an auxiliary memory unit 113, a network interface 114, a device interface 115, an antenna 116, and a power control device 117, which are connected to each other through a bus 118 and the like.

The power control device 117 causes the wireless communication device 1 to be in the sleep state. Here, the power control device 117 is provided as an independent device. However, the function of controlling power may be mounted in the processor 111 or the network interface 114.

The processor 111 reads a program from the auxiliary memory unit 113, develops the read program in the main memory unit 112, and executes the developed program. As a result, the functions of the transmission and reception processing section 101, the determination section 102, the reception range determination section 103, the candidate selection section 104, the candidate information accumulation section 105, the distribution generating section 106, and the measurement section 107.

The wireless communication device 1 in the present embodiment may be configured by installing a program executed in the wireless communication device 1, in the computer device in advance. The program may be stored in a storage medium such as a CD-ROM, or may be distributed through a network, and thus may be appropriately installed in the computer device so as to configure the wireless communication device 1.

The network interface 114 is an interface for being connected to the network. The network interface 114 performs transmission and reception of a wireless signal through the antenna 116. As the network interface 114, a network interface suitable for known wireless standards may be used. The transmission and reception processing unit 101 may be configured with the network interface 114. Here, only one network interface is described. However, a plurality of network interfaces may be mounted.

The device interface 115 is an interface for being connected to equipment such as an external storage medium 3. The external storage medium 3 may be any storage medium, for example, a HDD, a CD-R, a CD-RW, a DVD-RAM, a DVD-R, and a storage area network (SAN). The unit such as the candidate information accumulation section 105, which stores data, may be connected to the device interface 115 as the external storage medium 3.

The main memory unit 112 is a memory device which temporarily stores a command performed by the processor 111, and various types of data. The main memory unit 112 may be a volatile memory such as a DRAM or a non-volatile memory such as an MRAM. The auxiliary memory unit 113 is a storage device which can permanently store a program, data, or the like. For example, the auxiliary memory unit 113 is a HDD, an SSD, and the like. Data held by the candidate information accumulation section 105 and the like is actually stored in the main memory unit 112, the auxiliary memory unit 113, or the external storage medium 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device for wireless relay communication in a network of a plurality of nodes, the wireless communication device comprising:
   a network interface;
   a data storage; and
   a processor configured to
      determine whether or not to continue communication with a current parent node based on a communication status with the current parent node,
      upon determining not to continue communication with the current parent node, determine part of the nodes in the network to be one or more candidates for a new parent node, based on hop numbers of the nodes stored in the data storage, wherein a hop number of a node indicates a node distance between the node and a reference node,
      cause the network interface to be in a receivable state during time slots associated with the one or more candidates, and
      select one of the candidates as the new parent node, based on a communication status with each of the one or more candidates.

2. The wireless communication device according to claim 1, wherein the reference node is a root node of the network.

3. The wireless communication device according to claim 1, wherein the processor causes the network interface to be in a sleep state during time slots associated with other nodes of the network that are not the candidate nodes and are not child nodes.

4. The wireless communication device according to claim 1, wherein
   the nodes of which a hop number is within a predetermined difference from a hop number of the current parent node are determined as the candidates.

5. The wireless communication device according to claim 1, wherein
   the processor is configured to select one candidate with the best communication status as the new parent node.

6. The wireless communication device according to claim 1, wherein the communication status includes at least one of:
   whether or not a connection between the wireless communication device and a candidate has been disconnected in a predetermined period of time, the number of times the connection has been disconnected in a predetermined period of time, and the number of times the connection has been disconnected consecutively.

7. The wireless communication device according to claim 1, wherein the communication status includes at least one of:
   the number of nodes that transmits data to a candidate, the number of data units that the candidate receives data from the other nodes, and a hop number of the candidate.

8. The wireless communication device according to claim 1, wherein the communication status includes at least one of:
   strength of signals transmitted from a candidate to the wireless communication device, and an error rate of data transmitted from the candidate to the wireless communication device.

9. The wireless communication device according to claim 1, wherein
   the processor causes the network interface to transmit data to the new parent node during a time slot assigned to the wireless communication device for data communication with the new parent node.

10. The wireless communication device according to claim 1, wherein
    upon determining to not continue communication with the current parent node, the processor repeats determination of anode in the network as a preliminary candidate a predetermined number of times, and generates a distribution map regarding hop numbers of one or more preliminary candidates, and
    said one or more candidates are determined from said one or more preliminary candidates based on the distribution map.

11. The wireless communication device according to claim 10, wherein
    the processor initializes the distribution map upon a predetermined condition being met.

12. The wireless communication device according to claim 11, wherein the predetermined condition includes at least one of:
    a number of times data transmission to nodes other than the current parent node has been carried out,
    a number of times data reception from the nodes other than the current parent node has been carried out, a number of times selection of candidates has been carried out, an average hop number of the nodes in the network, and a change in the average hop number.

13. The wireless communication device according to claim 1, wherein upon determining to not continue communication with the current parent node, the processor determines whether or not a number of times communication with the parent node continuously failed to reach a predetermined value, and upon determining that the number of times has not reached the predetermined value, the processor carries out determination of said one or more candidates.

14. A method for establishing a wireless relay communication network of a plurality of nodes, each of which is a wireless communication device, the method comprising, at a wireless communication device:

determining whether or not to continue communication with a current parent node based on a communication status with the current parent node;

upon determining not to continue communication with the current parent node, determining part of the nodes in the wireless relay communication network to be one or more candidates for a new parent node, based on hop numbers of the nodes in the wireless relay communication network, wherein a hop number of a node indicates a node distance between the node and a reference node in the wireless relay communication network;

causing a network interface of the wireless communication device to be in a receivable state during time slots associated with the one or more candidates; and selecting one of the candidates as the new parent node, based on a communication status with each of the one or more candidates.

15. The method according to claim 14, further comprising:

causing the network interface to be in a sleep state during time slots associated with other nodes of the wireless relay communication network that are not the candidate nodes and are not child nodes.

16. The method according to claim 14, wherein the nodes of which a hop number is within a predetermined difference from a hop number of the current parent node are determined to be the one or more candidates.

17. The method according to claim 14, further comprising:

upon determining to not continue communication with the current parent node, repeating determination of a node in the wireless relay communication network as a preliminary candidate a predetermined number of times, and generating a distribution map regarding hop numbers of one or more preliminary candidates, wherein said one or more candidates are determined from said one or more preliminary candidates based on the distribution map.

18. The method according to claim 17, further comprising:

initializing the distribution map upon a predetermined condition being met.

19. A non-transitory computer readable medium comprising a program that is executable in a wireless communication device located at a node of a wireless relay communication network including a plurality of nodes, to perform a method of:

determining whether or not to continue communication with a current parent node based on a communication status with the current parent node;

upon determining not to continue communication with the current parent node, determining part of the nodes in the wireless relay communication network to be one or more candidates for a new parent node, based on hop numbers of the nodes in the wireless relay communication network, wherein a hop number of a node indicates a node distance between the node and a reference node in the wireless relay communication network;

causing a network interface of the wireless communication device to be in a receivable state during time slots associated with the one or more candidates; and selecting one of the candidates as the new parent node, based on a communication status with each of the one or more candidates.

20. The non-transitory computer readable medium according to claim 19, wherein the method further comprises causing the network interface to be in a sleep state during time slots associated with other nodes of the wireless relay communication network that are not the candidate nodes and are not child nodes.

* * * * *